(12) United States Patent
Want et al.

(10) Patent No.: US 7,202,783 B2
(45) Date of Patent: Apr. 10, 2007

(54) METHOD AND SYSTEM FOR IDENTIFYING WHEN A FIRST DEVICE IS WITHIN A PHYSICAL RANGE OF A SECOND DEVICE

(75) Inventors: Roy Want, Los Altos, CA (US); James Kardach, Saratoga, CA (US); Graham D. Kirby, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 75 days.

(21) Appl. No.: 10/025,068

(22) Filed: Dec. 18, 2001

(65) Prior Publication Data

US 2003/0114104 A1 Jun. 19, 2003

(51) Int. Cl.
*G08B 13/14* (2006.01)

(52) U.S. Cl. ............... 340/568.1; 340/586; 340/572.1; 340/539.1; 340/426.21; 455/39

(58) Field of Classification Search ............ 340/568.1, 340/568.2, 571, 572.1, 586, 426.2, 426.21, 340/539.1, 539.11, 539.22, 505, 500; 455/39
See application file for complete search history.

(56) References Cited

U.S. PATENT DOCUMENTS

| | | | |
|---|---|---|---|
| 4,775,928 A | 10/1988 | Kendall et al. | |
| 5,497,339 A | 3/1996 | Bernard | |
| 5,566,069 A | 10/1996 | Clark et al. | |
| 5,802,468 A | 9/1998 | Gallant et al. | |
| 5,818,425 A | 10/1998 | Want et al. | |
| 5,845,282 A | 12/1998 | Alley et al. | |
| 5,874,960 A | 2/1999 | Mairs et al. | |
| 5,910,802 A | 6/1999 | Shields et al. | |
| 5,937,421 A | 8/1999 | Petrov et al. | |
| 5,949,351 A | 9/1999 | Hahm | |
| 5,952,638 A | 9/1999 | Demers et al. | |
| 5,982,520 A | 11/1999 | Weiser et al. | |
| 6,078,251 A * | 6/2000 | Landt et al. | ............. 340/572.1 |
| 6,104,392 A | 8/2000 | Shaw et al. | |
| 6,128,661 A | 10/2000 | Flanagin et al. | |
| 6,195,589 B1 | 2/2001 | Ketcham | |
| 6,212,650 B1 | 4/2001 | Guccione | |
| 6,233,611 B1 | 5/2001 | Ludtke et al. | |
| 6,271,839 B1 | 8/2001 | Mairs et al. | |
| 6,292,181 B1 | 9/2001 | Banerjee et al. | |

(Continued)

OTHER PUBLICATIONS

"winamp.com, Winamp 2.05, Nov. 15, 1998" retrieved from http://web.archive.org for site http://www.winamp.com on Mar. 31, 2005, (2 pgs.).

(Continued)

*Primary Examiner*—Daniel Wu
*Assistant Examiner*—Daniel Previl
(74) *Attorney, Agent, or Firm*—Blakely, Sokoloff, Taylor & Zafman LLP

(57) ABSTRACT

A method and apparatus is provided for identifying which one of a plurality of first devices, within a wireless communication range of a second device, the second device is to establish substantive communications with. The method includes sensing which particular first device is within a physical range of the second device, and establishing substantive communications with the particular first device.

31 Claims, 3 Drawing Sheets

U.S. PATENT DOCUMENTS

| | | |
|---|---|---|
| 6,292,186 B1 | 9/2001 | Lehman et al. |
| 6,334,575 B1 | 1/2002 | Su-Hui |
| 6,401,059 B1 | 6/2002 | Shen et al. |
| 6,409,086 B1 * | 6/2002 | Pellaumail et al. .... 235/462.13 |
| 6,411,275 B1 | 6/2002 | Hedberg |
| 6,418,324 B1 | 7/2002 | Doviak et al. |
| 6,421,232 B2 * | 7/2002 | Sallam ....................... 361/681 |
| 6,433,685 B1 * | 8/2002 | Struble et al. ............... 340/571 |
| 6,456,938 B1 | 9/2002 | Barnard |
| 6,456,958 B1 * | 9/2002 | Xydis ......................... 702/158 |
| 6,462,810 B1 * | 10/2002 | Muraoka et al. ........ 356/139.04 |
| 6,463,300 B1 | 10/2002 | Oshima |
| 6,507,762 B1 | 1/2003 | Amro et al. |
| 6,614,350 B1 | 9/2003 | Lunsford et al. |
| 6,629,197 B1 | 9/2003 | Bhogal et al. |
| 6,654,032 B1 | 11/2003 | Zhu et al. |
| 6,731,908 B2 * | 5/2004 | Berliner et al. .......... 455/67.11 |
| 6,784,855 B2 | 8/2004 | Matthews et al. |
| 6,788,934 B2 | 9/2004 | Keenan et al. |
| 6,813,674 B1 | 11/2004 | Velasco et al. |
| 6,826,387 B1 | 11/2004 | Kammer |
| 6,859,197 B2 | 2/2005 | Klein et al. |
| 6,859,882 B2 | 2/2005 | Fung |
| 2002/0002707 A1 | 1/2002 | Ekel et al. |
| 2002/0011951 A1 | 1/2002 | Pepin et al. |
| 2002/0054412 A1 * | 5/2002 | Keller et al. ................ 359/172 |
| 2002/0059434 A1 | 5/2002 | Karaoguz et al. |
| 2002/0077992 A1 | 6/2002 | Tobin |
| 2002/0078161 A1 | 6/2002 | Cheng |
| 2002/0087300 A1 | 7/2002 | Patwari |
| 2002/0091785 A1 | 7/2002 | Ohlenbusch et al. |
| 2002/0109665 A1 | 8/2002 | Matthews et al. |
| 2002/0128872 A1 | 9/2002 | Giammattei |
| 2002/0156677 A1 | 10/2002 | Peters et al. |
| 2002/0169000 A1 | 11/2002 | King |
| 2002/0174025 A1 * | 11/2002 | Hind et al. ................... 705/26 |
| 2002/0186676 A1 | 12/2002 | Milley et al. |
| 2002/0199008 A1 | 12/2002 | Pecen et al. |
| 2003/0001882 A1 | 1/2003 | Macer et al. |
| 2003/0004678 A1 | 1/2003 | Zhang et al. |
| 2003/0013483 A1 | 1/2003 | Ausems et al. |
| 2003/0018581 A1 | 1/2003 | Bratton et al. |
| 2003/0028609 A1 | 2/2003 | Cahill |
| 2003/0054794 A1 | 3/2003 | Zhang |
| 2003/0103088 A1 | 6/2003 | Dresti et al. |
| 2003/0131715 A1 | 7/2003 | Georges |

OTHER PUBLICATIONS

Bonner, Murray, "What is BREW", http://www.developer.com/ws/brew/article.php/1454711. Citation. (5pgs.).

"Remote Display Control for Pocket PC", http://www.ppc4all.com/apdetail.php?id=710, Citation Date May 3, 2001, (3 pgs.).

Brown, Bruce & Marge, "Quick PDA Data Exchange" http://www.pcmag.com/article2/0,1759,1962,00.asp; Citation Date: May 22, 2001, (6 pgs.).

Richardson, Tristan, et al., "virtual Network Computing", IEEE (http://computer.org/Internet/, Jan.-Feb. 1998, (6pgs.).

Lee. Wei-Meng, "Displaying PocketPC and Smartphone Screens on Your PC," http://www.oriellynet.com/pub/a/wireless/2004/10/15/remote_display.html. (supplemental art-remote display known in 1997).

Hamburgen, William R., et al., "ISTY: Stretching the bounds of Mobile Computing," IEEE Computer Apr. 2001; pp. 28-36.

Want, Roy, et al., "Survey on Information Appliances," IEEE May/Jun. 2000.

Liou, Ay-Hwa Andy, et al, "The Design of PDA Application Schemes for Wireless Communication Services," IEEEE 1996.

PalmPilot™ Handbook, 1997, pp. 27-29.

\* cited by examiner

(12) United States Patent US 7,202,783 B2

METHOD AND SYSTEM FOR IDENTIFYING WHEN A FIRST DEVICE IS WITHIN A PHYSICAL RANGE OF A SECOND DEVICE

FIELD OF THE INVENTION

The present invention relates generally to wireless communication devices. In particular, it relates to a method and system for sensing when two devices are within a physical range of each other.

BACKGROUND OF THE INVENTION

Ubiquitous wireless communication devices are becoming more and more prevalent in replacing fixed cables in mobile computing environments. Typical examples of such wireless devices are Bluetooth 802.15, 802.11b and 802.11a communication modules, or the like. For example, in Bluetooth enabled devices, neighboring devices are able to communicate with each other in an automated fashion when they are within a wireless communication range of typically about 10 meters. Thus, in a typical environment in which a plurality of Bluetooth enabled devices are present, and the relative physical arrangement of the devices in unknown, a master device including a Bluetooth transceiver may communicate with more than one slave device which is also Bluetooth enabled. In addition, radio propagation such as Bluetooth communication, may pass through walls of a dwelling or office and, accordingly, the master device may erroneously communicate with a slave device which is outside of the current location of the master device.

DESCRIPTION OF THE DRAWINGS

The invention is now described, by way of non-limiting example, with reference to the accompanying diagrammatic drawings.

In the drawings.

DETAILED DESCRIPTION

Figure 1:
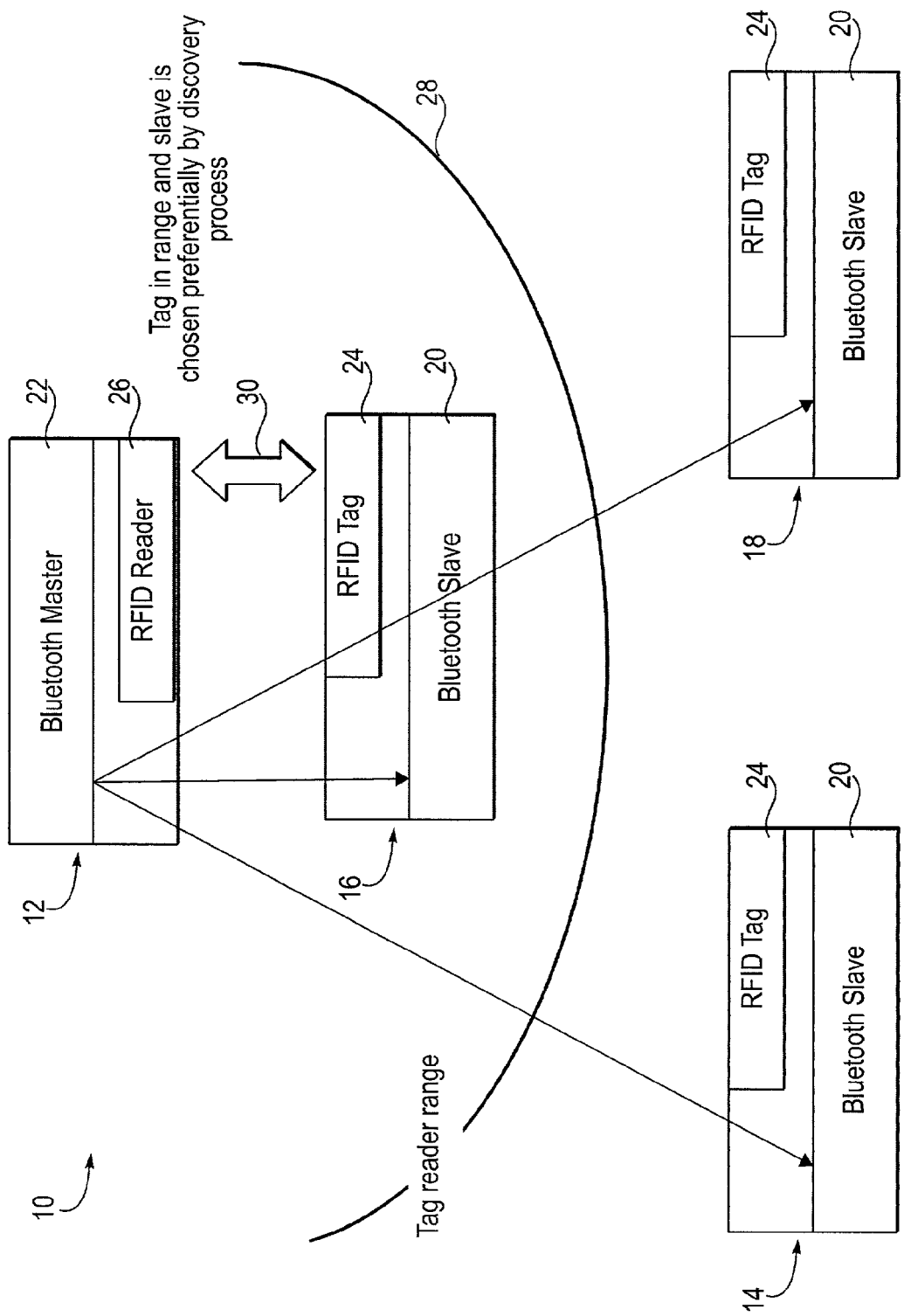
FIG. 1 shows a schematic block diagram in accordance with one embodiment.

Referring to the drawings, reference numeral 10 generally indicates a system, in accordance to the invention, which includes a computer access device 12, also in accordance to the invention, which is configured to communicate with a plurality of portable electronic devices 14, 16, 18, also in accordance with the invention. As described in more detail below, the computer access point 12 is configured to sense when one of the portable electronic devices 14, 16, 18 is within a predetermined physical range whereafter substantive communication is commenced.

The computer access device 12 typically defines a master device which is located, for example, at a fixed station such as a desk, airport terminal kiosk, or any other location where access to a computer network or enhanced processing capabilities is required. In one embodiment, the portable electronic devices 14, 16, 18 may include personal digital assistants (PDA), MP3 players, or any other portable electronic device which a user typically carries on his or her person. Users may, for various reasons, wish to use the portable electronic devices 14, 16, 18 to communicate with the computer access device 12, e.g. to use enhanced processing capabilities of the computer access device 12, to upload and/or download data, to access the Internet, or the like. Accordingly, each portable electronic device 14, 16, 18, in addition to its standard circuitry for carrying out the functionality for which it is designed, includes a Bluetooth wireless communication interface or slave module 20 which is configured to communicate with a Bluetooth wireless communication interface or master module 22 when the two modules 20, 22 are within a wireless communication range. Typically, for Bluetooth technology, the wireless communication range is of the order of 10 meters.

The portable electronic devices 14, 16, 18 typically have reduced processing capabilities as a result of their portable nature and it may thus be convenient for a user to use enhanced processing capabilities which are typically provided by the computer access device 12. However, it is to be appreciated, that the portable electronic devices 14, 16, 18 may be in the form of any portable electronic device which communicates with another electronic device using a wireless communication link. Thus, if the computer access device 12 forms part of point of sale terminal or transactional environment, the portable electronic devices 14, 16, 18 may function as a financial instruments allowing the purchase of various goods.

In addition to the slave module 20 each portable electronic device 14, 16, 18 includes a radio frequency identification (RFID) tag 24 and, accordingly, the computer access device 12 includes a complimentary RFID reader 26. As in conventional Bluetooth master/slave communication devices, each slave module 20 is operable to communicate in an on-the-fly fashion with a plurality of different master modules 22 which are within its wireless communication range. Thus, in the transaction scenario mentioned above, and in which a bearer of the portable electronic device 16 wishes to transact or communicate with the master module 22, the computer access device 12 may not be able to identify the particular bearer of the portable electronic device 14 as it could be communicating with any one of the portable electronic devices 14, 16, 18 within its wireless communication range.

In order uniquely to identify which particular portable electronic device 14, 16, 18 is within a predetermined physical range 12 (see FIG. 1) of the computer access device 12, the RFID reader 26 transmits a near field signal (see arrow 30) and, due to the nature of the RFID reader 26 and the RFID tag 24, only the RFID tag 24 of the portable electronic device 16 is sensed or detected by the RFID reader 26 as it is within the predetermined physical range or distance 28. Thus, the computer access device 12, using a range sensor defined by the RFID reader 26 and the RFID tag 24, identifies which one of the portable electronic devices 14, 16, 18 it should communicate with and, once the portable electronic device 16 has been identified, substantive communication between the two modules 20 and 22 commences.

The nature of the substantive communication between each portable electronic device 14, 16, 18 and the computer access device 12 may vary dependent upon the configuration of the device 14, 16, 18. For example, the particular electronic device 16 may be a portable computer and the computer access device 12 may provide the particular device 16 access to a computer network. Accordingly, the data transferred during substantive communications may be substantially the same as the data communicated between a laptop computer connected in a hardwired fashion to a network. During substantive communication, data uniquely associated with the portable electronic device 16, e.g., data requested by a bearer of the device 16, is communicated only between the portable electronic device 16 and computer access device 12. Prior to establishing substantive communication, and thus prior to identifying or sensing which particular portable electronic device 16 is within the physical range 28, the slave and master modules 20, 22 merely execute typical discovery protocols.

The physical range 28 may naturally change or vary depending on the particular installation of the computer access device 12 as well as the functionality for which the portable electronic devices 14, 16, 18 are configured. Thus, in environments in which one of the portable electronic devices 14, 16, 18 is used to effect payment for financial transactions, the range 28 may be substantially restricted. In most applications, the RFID reader 26 and the RFID tag 24 are configured in such a fashion so that the predetermined physical range 28 is about 1–12 inches, which is typically a distance which is small on a human scale and which allows unique localization to be assured. The physical range 28 is generally substantially less than the wireless communication range which is typically of the order of 30 feet, dependent upon the type of wireless communication technology used. Preferably, the wireless communication technology is selected so that its transmissions do not "spill out" of the locality that it services.

Figure 2:
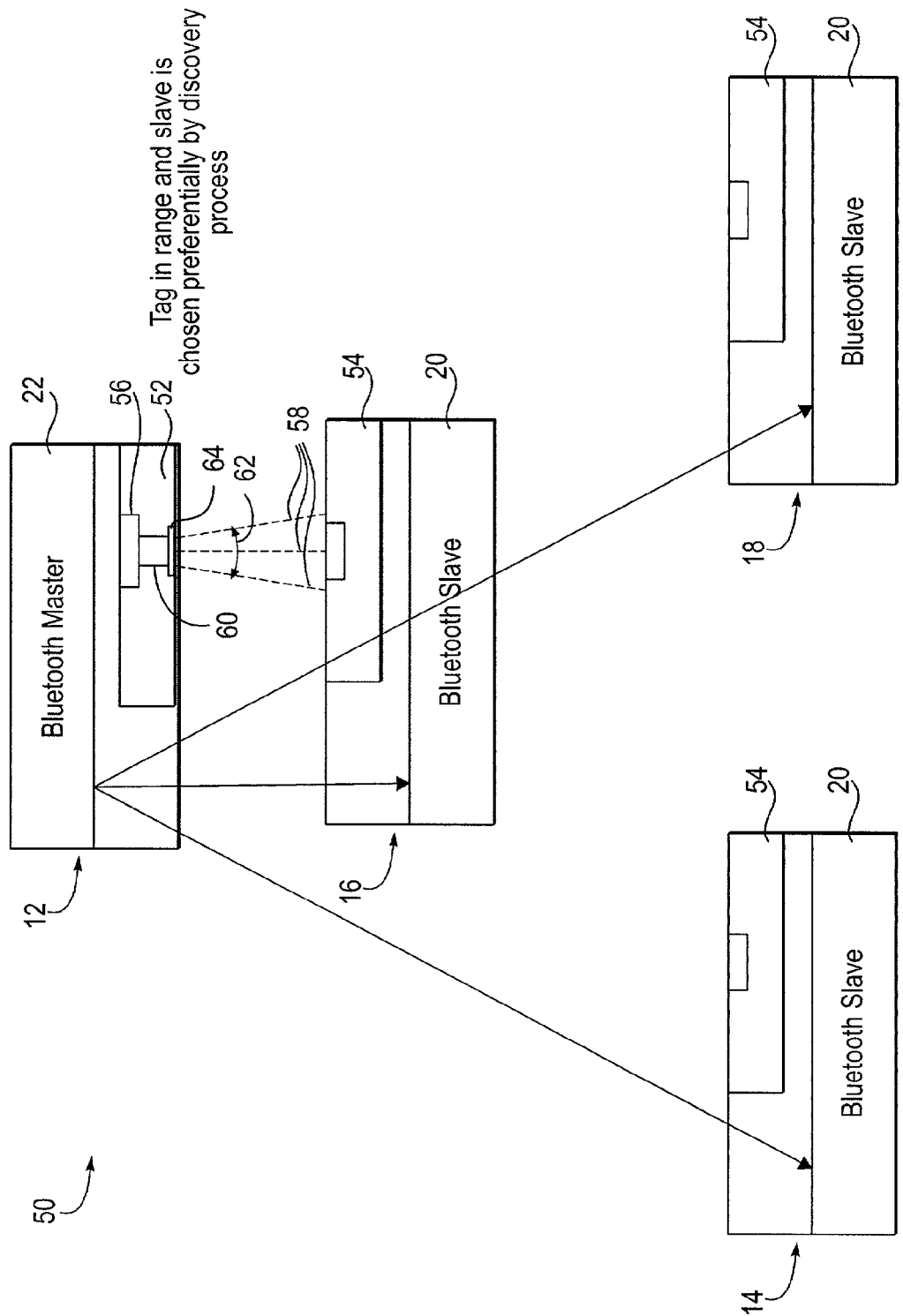
FIG. 2 shows a further embodiment of the system in accordance with an alternative embodiment.

Referring in particular to FIG. 2 of the drawings, reference numeral 50 generally indicates a further embodiment of the system 10 and, accordingly, like reference numerals have been used to indicate the same or similar features unless otherwise indicated. However, unlike the system 10 wherein the computer access device 12 includes the RFID reader 26 and the portable electronic devices 14, 16, 18 include the RFID tags 24, in the system 50 the computer access device 12 includes an optical arrangement 52 and each portable electronic device 14, 16, 18 includes a complimentary optical component 54 with which it is operable to communicate and which, in combination, define a range sensor. The optical arrangement 52 includes a light source 56 which emits light rays 58, the angular distribution of which is restricted by an optical guide in the form of a cylinder 60. The light source 56 is preferably an infra red (IR) light source so that its light does not distract users. In other embodiments, the light source 56 is a laser light source, rather than an incoherent light emitter with a collimator lens or even a crude collimator cylinder. In the embodiment illustrated, the cylinder 60 is arranged relative to the light source 56 so that the light rays 58 are limited to a physical angular range 62 so that, in use, the computer access device 12 is capable of sensing which one of the portable electronic device 14, 16, 18 is within closest proximity. Thus, as in the case of the system 10, the system 50 allows the computer access device 12 to sense and identify a particular portable electronic device 14, 16, 18 which is within the predetermined angular range 62 and with which it should communicate using the master and slave modules 22, 20 as described above with reference to the system 10. The predetermined angular range 62 defines a restricted physical area and, when a user bearing a portable electronic device 14, 16, 18 is within this restricted area, the computer access device 12 considers the person to be within a sufficiently close physical range on a human scale to commence communications with the portable electronic device 14, 16, 18. The sufficiently close human scale may thus be contrasted with the non-human wireless communication range. The computer access device 12 may thus only communicate with a nearby portable electronic device 14, 16, 18 when the user is, on a human scale, close to the access device 12. Thus, the predetermined physical range is substantially less than the wireless communication range, the physical range defining a restricted zone within which the computer access device 12 assumes that a user requires use of the computer access device 12.

In order to limit the intensity of the light source 56, in certain embodiments the optical arrangement 52 includes an optional filter 64. The filter 64 may thus define a range limiter so that when the separation or physical distance between the computer access device 12 and the portable electronic devices 14, 16, 18 increases, and thus the arc of the angular range 62 increases, the portable electronic devices 14, 16, 18 within the angular range 62 are not detected. Thus, the filter 64 may restrict the physical area or zone, adjacent to the computer access device 12, within which the computer access device 12 considers the portable electronic device 14, 16, 18 to be sufficiently close on a human scale to communicate with it. Further, the optical arrangement 52 typically intermittently emits the light rays 58 which may be modulated in a conventional fashion. The light rays 58 are typically intermittently transmitted so that, if a physically obstruction is temporally located between the computer access device 12 and the portable electronic device 16, once the obstruction has been removed the presence of the portable electronic device 16 may nevertheless be sensed. The optical component 54 of each portable electronic device 14, 16, 18 is typically a conventional infrared (IR) transceiver such as that using a conventional IrDA standard which is typically provided in PDAs or the like.

Figure 3:
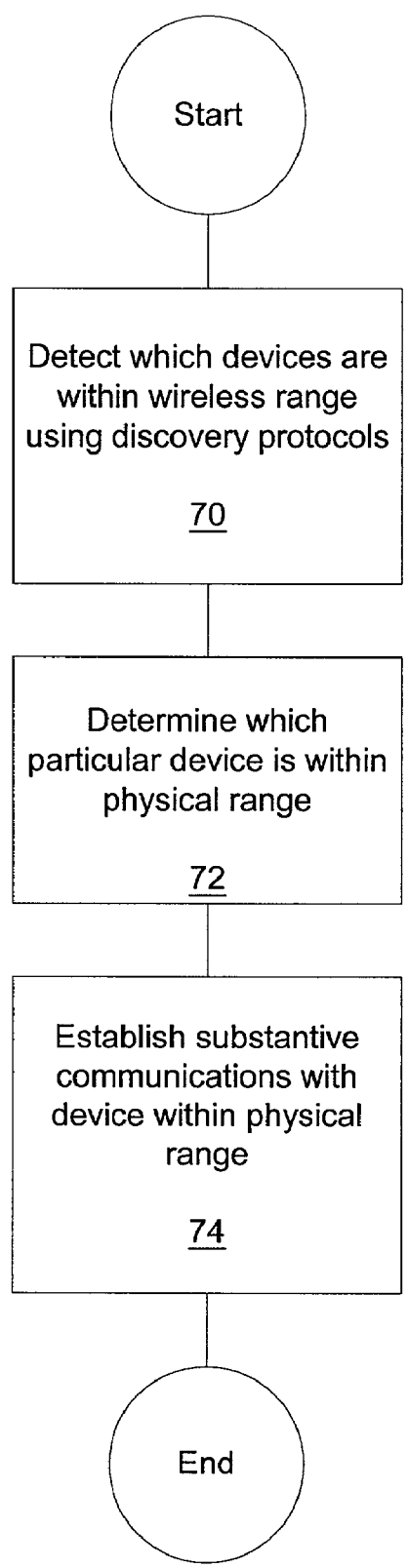
FIG. 3 shows a schematic flaw chart of a method used in the embodiments of FIGS. 1 and 2.

The system 10, 50 thus carries out a method or procedure (see FIG. 3) in which, in the embodiment depicted in the drawings, first detects which portable electronic devices 14, 16, 18 are within a wireless range (see step 70), and thereafter uses a wireless range sensor to determine which particular portable electronic device 14, 16, 18 is within a particular physical range 28, 62 (see step 72). Once the particular electronic device 16 has been identified as being within the range 28, 62, the computer access device 12 then establishes substantive communications between the master and slave modules 22, 20 (see step 74).

Although the system 10 has been described with reference to the Bluetooth wireless communication master module 22 and the Bluetooth wireless communication slave modules 20, it is to be appreciated that any other wireless communication technology may be used. For example, in certain embodiments of the invention, the communication modules 20, 22 may be 802.11a or 802.11b type modules. It is also however to be appreciated that the range sensor which, in the embodiments depicted in the drawings in the form of an optical range sensor and RFID sensor (e.g., such as that available from Trovan, Tiris, Bistatix, or the like), may take any other form. For example, the range sensor may be an audio sensor or the like. The invention, broadly, thus relates to the combination to two independent wireless communication arrangements, one of which is used to communicate substantive data between the portable electronic device 14 and the computer access device 12 (e.g., using Bluetooth technology) and the other used to sense when the portable electronic device 14 is within a physical range of the computer access device 12 (e.g., using RFID tag technology).

What is claimed is:

1. A computer access device comprising:
  a first wireless communication interface to communicate with at least one portable electronic device having a second wireless communication interface when a distance between the portable electronic device and the computer access device is within a first wireless range; and a range sensor to sense when a distance between the portable electronic device and the computer access device is within a second physical range, wherein the range sensor communicates with the portable electronic device separate from the first and second wireless communication interfaces.

2. A computer access device as claimed in claim 1, wherein the first and second wireless communication interfaces communicate using a standardized communication protocol, at least the first wireless communication interface to communicate with a plurality of second wireless communication interfaces each associated with a particular portable electronic device.

3. A computer access device as claimed in claim 2, wherein the range sensor senses which portable electronic devices is within the second physical range whereafter substantive communications between the computer access device and the predetermined portable electronic device are established via the first and second wireless communication interfaces.

4. A computer access device as claimed in claim 1, wherein the first and second wireless communication interfaces are communication modules which communicate using Bluetooth 802.15 technology.

5. A computer access device as claimed in claim 1, wherein the range sensor is a tag reader which communicates with a radio frequency identification (RFID) tag of the portable electronic device when the RFID tag is within the second range to identify the portable electronic device.

6. A computer access device as claimed in claim 1, wherein the range sensor is an optical arrangement to sense when the portable electronic device is within the second range, the second range being a predetermined angular range relative to the computer access device.

7. A computer access device as claimed in claim 6, wherein the optical arrangement comprises a guide to define the angular range.

8. A computer access device as claimed in claim 1, wherein the second physical range is substantially less than the first wireless range, the first wireless range being a wireless communication range of the computer access device.

9. A portable electronic device comprising:
a first wireless communication interface to communicate with a second wireless communication interface of a computer access device when a distance between the portable electronic device and the computer access device is within a first wireless range; and
a range sensing component which interacts with a range sensor of the computer access device to sense when a distance between the portable electronic device and the computer access device is within a second physical range, wherein the range sensing component communicates with the computer access device separate from the first and second wireless communication interfaces.

10. A portable electronic device as claimed in claim 9, wherein the first and second wireless communication interfaces communicate using a standardized communication protocol, the first wireless communication interface to communicate with a plurality of second wireless communication interfaces each associated with a particular computer access device.

11. A portable electronic device as claimed in claim 9, wherein the range sensing component enables the computer access device to identify the portable electronic device.

12. A portable electronic device as claimed in claim 9, wherein the range sensing component is a radio frequency identification (RFID) tag to communicate with a tag reader of the computer access device.

13. A portable electronic device as claimed in claim 9, wherein the range sensing component comprises an optical component to interact with an optical arrangement of the computer access device.

14. A portable electronic device as claimed in claim 9, wherein the first and second wireless communication interfaces are communication modules which communicate using Bluetooth technology.

15. A portable electronic device as claimed in claim 9, wherein the portable electronic device is selected from the group consisting a personal digital assistant (PDA), an MP3 player, and a personal computer.

16. A method comprising:
a first device selecting a second device from a plurality of devices located within a first wireless range from the first device to establish substantive communications with, wherein the selecting comprising sensing when a distance between the first device and the second device is within a second physical range, wherein the sensing comprises determining the second physical range using a range sensor separately from the first wireless range; and
establishing substantive communications with the second device using a communications interface.

17. A method as claimed in claim 16, wherein sensing when the particular device is within the second physical range is performed in a wireless fashion by a range sensor.

18. A method as claimed in claim 17, wherein:
each second device comprises an RFID tag uniquely associated with it; and
the method further comprises receiving an RFID tag signal to sense when the particular second device is within the second physical range.

19. A method as claimed in claim 17, further comprising sensing in an optical fashion when the particular second device is within the second physical range, the second physical range being a predetermined angular range relative to the first device.

20. A method as claimed in claim 17, wherein:
each second device comprises a second wireless communication interface and the first device comprises a first wireless communication interface; and
the method further comprises communicating between the first and second wireless communication interfaces using a standardized communication protocol.

21. A method as claimed in claim 20, wherein the standardized communication protocol uses Bluetooth communication protocols.

22. A method as claimed in claim 20, wherein:
the physical range is substantively less than the first wireless communication range; and
the method further comprises, once the particular second device has been identified, establishing substantive communications between the particular second device and the first device by means of the first and second wireless communication interfaces.

23. A method as claimed in claim 16, wherein establishing substantive communications comprises communicating data between the particular first device and the second device which is uniquely associated with the particular second electronic device.

24. A machine readable medium having stored thereon executable program code which, when executed, causes a machine to perform a method, the method comprising:
 a first device selecting a second device from a plurality of devices located within a first wireless range from the first device to establish substantive communications with, the selecting comprising sensing when a distance between the first device and the second device is within a second physical range, wherein the sensing comprises determining the second physical range using a range sensor separately from the first wireless range; and
 establishing substantive communications with the second device using a communications interface.

25. The machine readable medium as claimed in claim 24, wherein sensing when the particular device is within the second physical range is done in a wireless fashion by a range sensor.

26. The machine readable medium as claimed in claim 25, wherein:
 each second device comprises an RFID tag uniquely associated with it; and
 the method further comprises receiving an RFID tag signal to sense when the particular second device is within the second physical range.

27. The machine readable medium as claimed in claim 25, wherein the method further comprises sensing in an optical fashion when the particular second device is within the second physical range, the second physical range being a predetermined angular range relative to the first device.

28. The machine readable medium as claimed in claim 25, wherein:
 each second device comprises a second wireless communication interface and the first device includes a first wireless communication interface; and
 the method further comprises communicating between the first and second wireless communication interfaces using a standardized communication protocol.

29. The machine readable medium as claimed in claim 28, wherein the standardized communication protocol uses Bluetooth communication protocols.

30. The machine readable medium as claimed in claim 28, wherein:
 the physical range is substantively less than a wireless communication range; and
 the method further comprises, once the particular second device has been identified, establishing substantive communications between the particular second device and the first device by means of the first and second wireless communication interfaces.

31. The machine readable medium as claimed in claim 24, wherein establishing substantive communications comprises communicating data between the particular first device and the second device which is uniquely associated with the particular second electronic device.

* * * * *

UNITED STATES PATENT AND TRADEMARK OFFICE
CERTIFICATE OF CORRECTION

PATENT NO. : 7,202,783 B2 Page 1 of 1
APPLICATION NO. : 10/025068
DATED : April 10, 2007
INVENTOR(S) : Want et al.

It is certified that error appears in the above-identified patent and that said Letters Patent is hereby corrected as shown below:

In column 6, at line 18, delete "consisting" and insert --consisting of--.

In column 6, at line 24, delete "comprising" and insert --comprises--.

Signed and Sealed this

Fifteenth Day of April, 2008

JON W. DUDAS
*Director of the United States Patent and Trademark Office*